J. W. BOSTICK AND C. H. HOMER.
TREATMENT OF CRUDE PETROLEUM FOR PURIFICATION.
APPLICATION FILED JULY 29, 1919.
1,380,863.
Patented June 7, 1921.
2 SHEETS—SHEET 1.
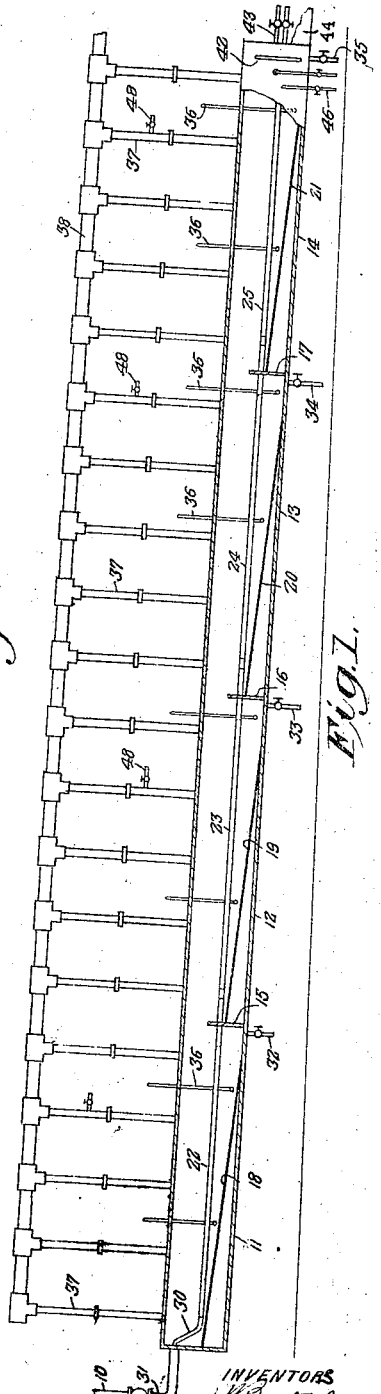
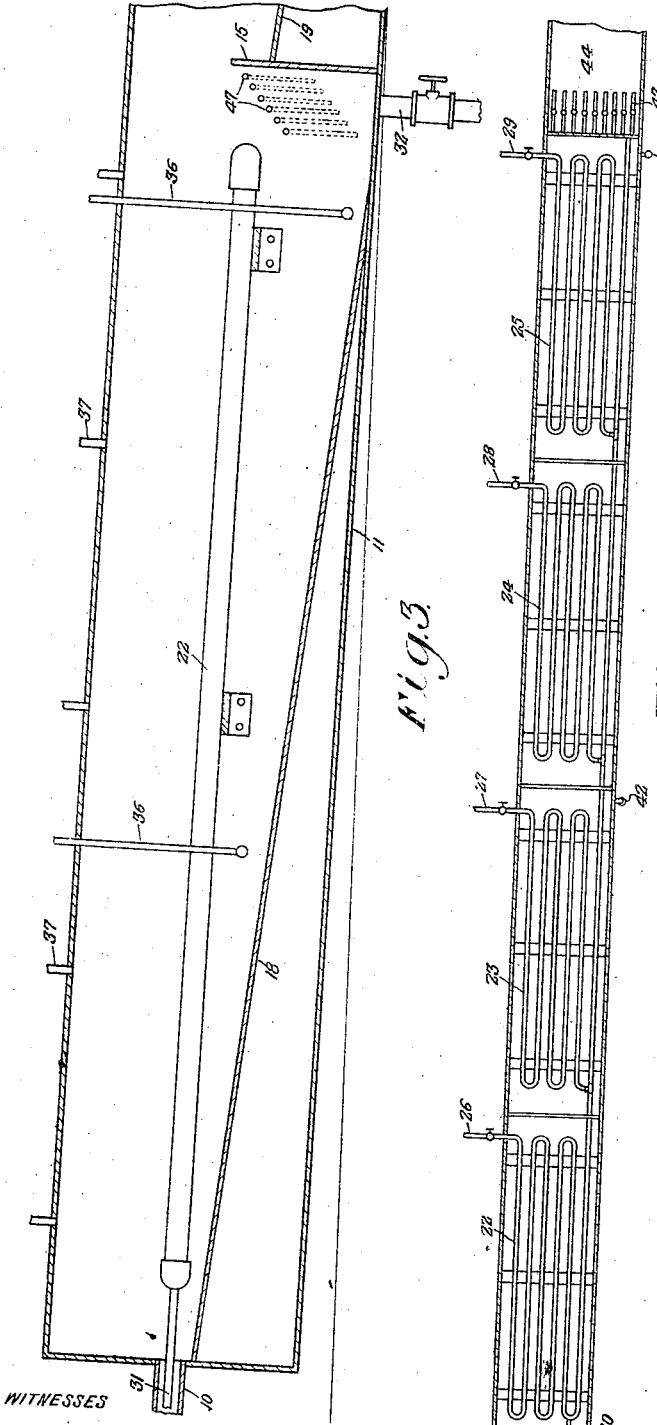

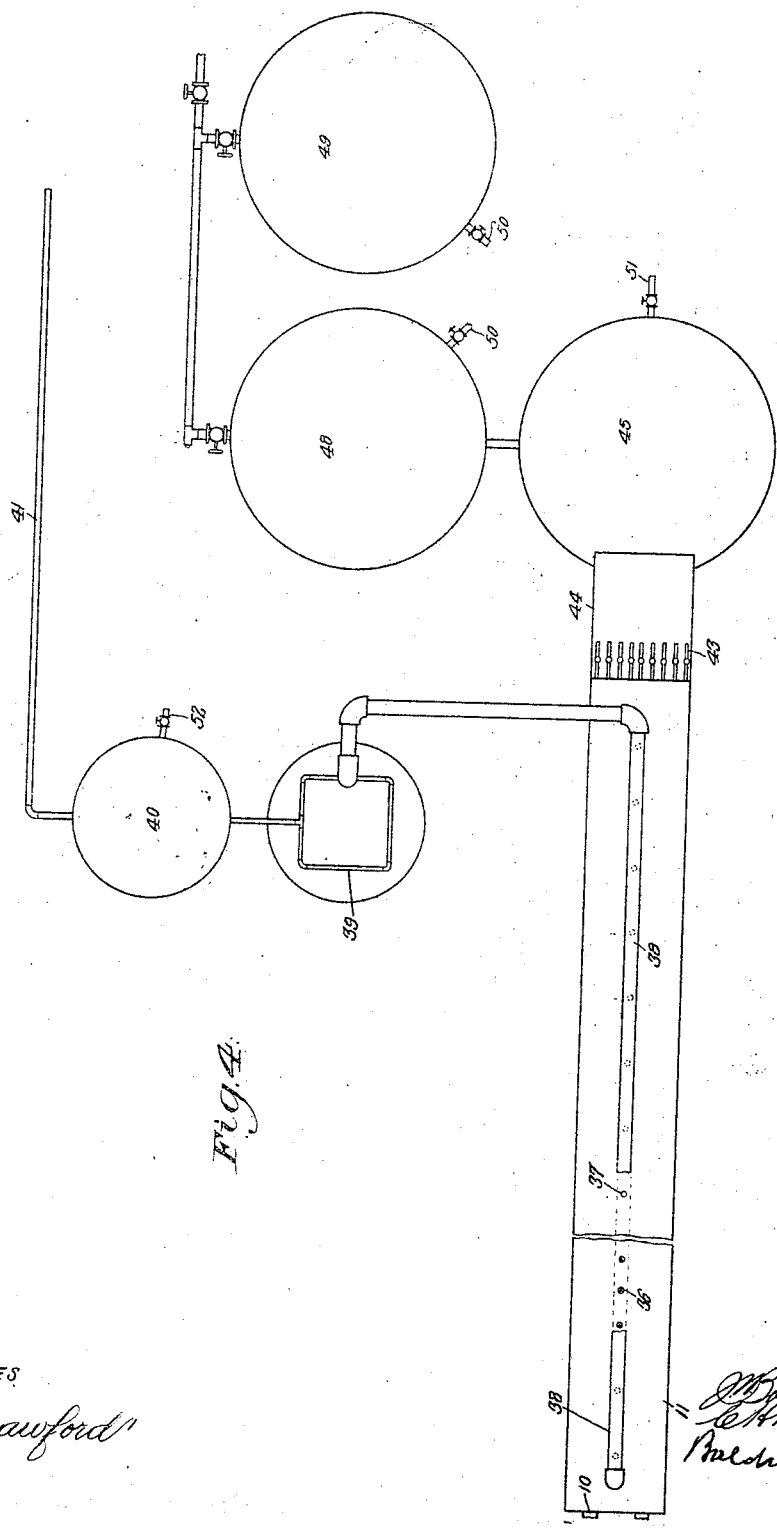

UNITED STATES PATENT OFFICE.

JOSEPH WALLACE BOSTICK AND CHARLES H. HOMER, OF HOUSTON, TEXAS.

TREATMENT OF CRUDE PETROLEUM FOR PURIFICATION.

1,380,863.  Specification of Letters Patent.  Patented June 7, 1921.

Application filed July 29, 1919. Serial No. 314,138.

*To all whom it may concern:*

Be it known that we, JOSEPH WALLACE BOSTICK and CHARLES H. HOMER, both citizens of the United States, and residing at Houston, Texas, have invented certain new and useful Improvements in the Treatment of Crude Petroleum for Purification, of which the following is a specification.

The present invention relates to the purification of crude petroleum by causing the separation and sedimentation of some of the impurities ordinarily contained therein, such as sand, clay, B. S., water, and under some conditions others, the stated results being secured by the use of heat supplied to the crude oil in a minimum quantity, and in a highly efficient manner with the simultaneous recovery of gasolene or other light fraction or fractions vaporized during the heating operation.

The operations are conveniently effected in an apparatus, as shown in the accompanying drawings, in which Figure 1 is a longitudinal section, partly in elevation, of an apparatus for carrying out the heating operation, and showing the header which leads to a suitable condenser.

Fig. 2 is a horizontal section of the same device, said section being taken on a plane below the cover.

Fig. 3 is a section of one of the elements or compartments of the device shown in Figs. 1 and 2.

Fig. 4 is a plan of the entire apparatus.

In the treatment of crude oil, or oil which has been subjected to slight purification already, such as filtration for example, the oil is introduced through the valved pipe 10 into the long tank-shaped device here shown as consisting of four compartments 11, 12, 13 and 14. This device contains baffles 15, 16, and 17, by which the long tank is divided into four, or any suitable number of compartments, these compartments being provided with sloped bottoms 18, 19, 20 and 21, and the entire tank slopes somewhat, a slope of, say from 4 to 8 inches in the length of the tank being sufficient. Located within the several compartments are steam heating coils 22, 23, 24 and 25, to which steam is supplied through pipes 26, 27, 28 and 29, from a suitable source. The steam, after passing through the coils, is conducted by pipe 30 into and through pipe 31 located within the pipe 10, to give the oil a preliminary heating, and thereby economize in the use of steam. By virtue of the sloping bottoms 18, etc., in combination with the baffles 15 etc., each of the compartments of the tank is kept substantially full of the oil under treatment, up to the level of the top of the baffle. The coil is located just below the normal liquid level in each of the respective tanks so that the entire body of oil does not become heated to the boiling point of water, but only the oil at the top of such body. The oil in the bottom of each of the compartments, below the coil may be at a temperature several degrees lower than the boiling point of water. It is only the oil which is at the top which can overflow the baffles and on account of the heat, practically all of the water and other insoluble impurities, such as sand, clay and the like is separated and settles to the bottom, where it gradually works its way toward the outlet pipes 32, 33, 34 and 35 in the bottoms of several compartments. These outlet pipes are provided with valves, as illustrated, which may be opened to draw off the sludge accumulating therein. By virtue of heat treatment, the B. S. carried in the oil will also, to a large extent, be decomposed, the globules of water in the oil being broken and small drops of water coalescing to form larger drops of water which will settle to the bottom carrying suspended clay, sand and the like.

During the flow of the oil through the heating tank, its temperature can be carefully watched by means of thermometers 36 located in the different compartments. Connected to the cover of the tank are a number of pipes 37, which in turn connect with a suitable header 38, through which the gases and vapors, liberated by the heating operation, are conducted to a suitable condenser 39, in which the gasolene and other vapors are condensed to liquid form and from which the liquid flows into tank 40, and may be drawn off through pipe 41 to a device for redistillation or other suitable treatment.

The length of the heating tank and the number of compartments therein formed by the several baffles should be such as to insure practically complete purification of the oil from the above mentioned impurities by the time the oil reaches the outlet end of the tank. For this purpose using a tank divided into four compartments, a length of 40 feet for the tank will be found sufficient with ordinary grades of crude oil. To show the height of the oil in the treating tank, gages 42 may be provided along one side of the tank as illustrated. The oil from the tank is drawn off through valved pipes 43 into a trough (which may be covered, if desired) 44, leading to the tank 45 for further purification.

The employment of baffles 15, etc., for dividing the tank up into sections, hastens the operation since it aids the small drops of water to coalesce, and this cuts down the length of time during which it is necessary to treat the oil, and also cuts down the amount of steam necessary to be employed. The heating operation seems also to cause a circulation or movement of the water in contact with the heated upper portion of the oil, whereby a washing of the oil, and consequent purification thereof, is effected, the water then dropping back through the oil, and carrying with it the sand, clay and the like, which accumulates at the bottom of the tank, where they are allowed to escape through the pipes 32 etc. Thus the water separated by heat treatment, acts to further purify the oil. It may be noted that in the places of greatest depth in the heating tank, the layer of oil is about a foot deep, it being understood that sedimentation is aided by the employment of a relatively shallow layer of oil. The several pipes 43, through which the oil finds its exit from the heating tank, may be arranged at different levels so as to regulate the height of the oil in the last compartment, and the rate of flow through the tank.

As a check on the operation, and for the purpose of controlling the flow of the oil, a number of sampling pipes 46 may be provided at the outlet end of the last compartment. Also if desired, similar sampling pipes may be connected with each of the compartments of the tank, as illustrated at 47 in Fig. 3.

Vapor sampling pipes 48 may also be connected to the vapor exit pipes 37 or to the upper part of the long tank, above the liquid held therein.

The oil leaving the trough or apron 44 flows into the tank 45. This tank is preferably of large capacity, say, 75 to 100 barrels, and is preferably filled to within 6 or 8 inches of its outlet with hot water. The temperature of the water is maintained by suitable steam coils or otherwise, a temperature just below the boiling point being found suitable. The oil flowing into this is washed by the hot water, and the impurities, to a certain extent, absorbed by the hot water, and without producing any substantial amount of emulsification. In fact the tendency for this hot water is to break up any traces of B. S., carried in the oil. For this purpose the temperature of the water in this vat or tank should be kept just below the boiling point, but never allowed to boil. The oil is then allowed to flow into the tanks 48 and 49, for settlement, suitable outlets 50 being provided at the bottoms of these tanks. The water level in the tank 45 may conveniently be regulated by means of a valved pipe 51.

The gasolene and like material collected in the tank 40 (which may be a tank of say, 20 or 25 gallons capacity) is allowed to settle therein and any water which separates therefrom may be drawn off through the valved pipe 52.

We claim:

1. A process of treating crude petroleum oil, which comprises gently flowing the same in a relatively quiescent state through a series of shallow tanks in which the oil is heated at its upper part to a substantially higher temperature than at its lower part, allowing sedimentation in each of said tanks, drawing off separately from each of said bodies of oil the impurities which settle out, allowing oil from the surface portions only of said shallow bodies of oil to progress to the succeeding bodies, and drawing off and condensing the vapors evolved in such heating operation.

2. A process of treating petroleum oil, which comprises establishing a series of shallow relatively quiescent bodies of oil with heating means in contact with the upper portions only of such bodies, allowing oil to flow from the upper part only of each of such bodies except the last, into the next succeeding body, drawing off sediment from the lower part of each of such bodies of oil, drawing off oil from the upper part only of the last of said bodies of oil, bringing the same into a body of hot water for further purification, and finally allowing settlement of the so-treated oil.

3. An apparatus for treating oily material comprising an elongated tank divided into a series of shallow compartments, closed heating means in each of said compartments entirely located near the normal liquid levels therein, baffles separating said compartments, except at their tops, over which the oil may flow from one compartment to the next, a cover for said tank, vapor draw-off connections to the upper part of said tank, and a condenser in communication therewith, liquid draw-off connections to the bottoms of each of said compartments, an oil inlet to the first of said compartments, and an oil outlet from the last of said compartments.

4. In apparatus as specified in claim 3, heating means located in the oil inlet.

5. The combination of a deep washing tank and a settling tank, connected to the oil outlet of the apparatus of claim 3.

In testimony whereof, we have hereunto subscribed our names.

JOSEPH WALLACE BOSTICK.
CHARLES H. HOMER.